United States Patent
Kim et al.

(10) Patent No.: US 9,172,635 B2
(45) Date of Patent: Oct. 27, 2015

(54) ETHERNET BACKBONE NETWORK SYSTEM FOR VEHICLE AND METHOD FOR CONTROLLING FAIL SAFE OF THE ETHERNET BACKBONE NETWORK SYSTEM

(71) Applicant: Hyundai Motor Company, Seoul (KR)

(72) Inventors: Seung Su Kim, Seoul (KR); Hyun Cheol Bae, Gyeonggi-do (KR); Woo Sub Kim, Gyeonggi-do (KR); Seong Jin Park, Daejeon (KR); Chung Hi Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 64 days.

(21) Appl. No.: 14/140,175

(22) Filed: Dec. 24, 2013

(65) Prior Publication Data

US 2015/0085645 A1    Mar. 26, 2015

(30) Foreign Application Priority Data

Sep. 23, 2013 (KR) .................. 10-2013-0112597

(51) Int. Cl.
*H04L 1/00* (2006.01)
*G06F 11/00* (2006.01)
*H04L 12/707* (2013.01)
*H04L 12/703* (2013.01)

(52) U.S. Cl.
CPC ............. *H04L 45/22* (2013.01); *H04L 45/28* (2013.01)

(58) Field of Classification Search
CPC ............................. H04L 45/22; H04L 41/0654
See application file for complete search history.

(56) References Cited

U.S. PATENT DOCUMENTS

| | | | | |
|---|---|---|---|---|
| 5,173,689 A | * | 12/1992 | Kusano | 370/225 |
| 7,430,164 B2 | * | 9/2008 | Bare | 370/217 |

FOREIGN PATENT DOCUMENTS

| | | |
|---|---|---|
| JP | 2009-239359 A | 10/2009 |
| JP | 2011-205444 A | 10/2011 |
| KR | 10-2005-0101693 | 10/2005 |
| KR | 10-2006-0088642 | 8/2006 |
| KR | 10-2007-0082299 A | 8/2007 |

(Continued)

OTHER PUBLICATIONS

Toyota (the next generation Automotive Network, Sep. 19, 2012, Hideki Goto toyota motor corporation).*

(Continued)

*Primary Examiner* — Maharishi Khirodhar
(74) *Attorney, Agent, or Firm* — Mintz Levin Cohn Ferris Glovsky and Popeo, P.C.; Peter F. Corless (57) ABSTRACT

A backbone network system for a vehicle enables high-speed and large-capacity data transmission between integrated control modules mounted in the vehicle, such that communication can be maintained through another alternative communication line when an error occurs in a specific communication line. The backbone network system enables various kinds of integrated control modules mounted in the vehicle to perform large-capacity and high-speed communications, based on Ethernet communication, by connecting domain gateways of the integrated control modules through an Ethernet backbone network, and provides a fast fail-safe function so that domain gateways can perform communications through another communication line when an error occurs in a communication line between the domain gateways.

7 Claims, 5 Drawing Sheets

(56) References Cited

FOREIGN PATENT DOCUMENTS

| | | |
|---|---|---|
| KR | 10-2007-0084020 | 8/2007 |
| KR | 10-2010-0086363 A | 7/2010 |
| KR | 10-2011-0097516 | 8/2011 |

OTHER PUBLICATIONS

Goto, Hideki, "The Next Generation Automotive Network—Updates of the Related Activities in Japan", Toyota Motor Group, 2nd Ethernet & IP @ Automotive Technology Day, Sep. 19, 2012.

* cited by examiner

- Normal operation

- Occurrence of error

| Source | Destination | Route | Priority order |
|--------|-------------|-------|----------------|
| E1 | E2 | G1 → G2 → G3 | 1 |
| | | G1 → G3 | 2 |

ETHERNET BACKBONE NETWORK SYSTEM FOR VEHICLE AND METHOD FOR CONTROLLING FAIL SAFE OF THE ETHERNET BACKBONE NETWORK SYSTEM

CROSS-REFERENCE TO RELATED APPLICATION

This application claims under 35 U.S.C. §119(a) the benefit of Korean Patent Application No. 10-2013-0112597 filed Sep. 23, 2013, the entire contents of which are incorporated herein by reference.

BACKGROUND (a) Technical Field

The present invention relates to an Ethernet backbone network system for a vehicle and a method for controlling a fail safe of the Ethernet backbone network system. More particularly, the present invention relates to an Ethernet backbone network system for a vehicle and a method for controlling a fail safe of the Ethernet backbone network system, in which high-speed and large-capacity data transmission is possible between integrated control modules mounted in the vehicle, and communication can be maintained through another alternative communication line when an error occurs in a specific communication line.

(b) Description of the Related Art

A chassis integrated control system, a body control module (BCM), and integrated control modules such as a multimedia system integrated with an external interface function, a navigation function and the like are mounted in a vehicle. In particular, the chassis integrated control system integrally controls a suspension system, a steering system, a braking system and the like including a power train unit for controlling an engine, a transmission and the like. The BCM integrally controls various kinds of convenience devices including a vehicle speed sensitive wire, a power window and the like.

As functions related to convenience of a vehicle and safety specifications are increased, an increasing number of various kinds of integrated control modules may be mounted in the vehicle. Accordingly, the integrated control modules are connected through communication networks of various speeds according to a required communication environment.

However, there is a limitation in performing large-capacity data transmission/reception and high-speed communication, using only existing communication protocols (e.g., CAN, FlexRay, Most, etc.) due to an increase in the number of controllers mounted in a next-generation vehicle and an increase in the request for multimedia services.

Accordingly, as a large-capacity/high-speed communication system is required due to an increase in the number of controllers mounted in a vehicle and an increase in the demand for multimedia services, a backbone network technology which can be mounted in the vehicle, based on Ethernet communication, has been developed.

SUMMARY

The present invention provides an Ethernet backbone network system for a vehicle, which enables various kinds of integrated control modules mounted in the vehicle to perform large-capacity and high-speed communications, based on Ethernet communication, by connecting domain gateways of the integrated control modules through an Ethernet backbone network.

The present invention also provides a method for controlling a fail safe of an Ethernet backbone network system for a vehicle, which can ensure the reliability of an Ethernet backbone network by providing a fast fail-safe function so that domain gateways can perform communications through another communication line when an error occurs in a communication line between the domain gateways.

In one aspect, the present invention provides an Ethernet backbone network system for a vehicle, including: a chassis gateway for communication of a chassis integrated control system; a power train gateway for communication of a power train control unit; a body gateway for communication of a body control module; a multimedia gateway for communication for a multimedia system; a first Ethernet communication link for connecting the chassis gateway and the power train gateway to communicate with each other; a second Ethernet communication link for connecting the chassis gateway and the body gateway to communicate with each other; a third Ethernet communication link for connecting the body gateway and the multimedia gateway to communicate to each other; a fourth Ethernet communication link for connecting the multimedia gateway and the power train gateway to communicate with each other; a fifth Ethernet communication link for connecting the chassis gateway and the multimedia gateway to communicate with each other; and a sixth Ethernet communication link for connecting the power train gateway and the body gateway to communicate with each other.

In an exemplary embodiment, components of the chassis integrated control system, components of the power train control unit, components of the body control module or components of the multimedia system may be connected to communicate with each other by one communication protocol selected from CAN, FlexRay and Most.

In another aspect, the present invention provides a method for controlling a fail safe of an Ethernet backbone network system for a vehicle, the method including: building up an Ethernet backbone network by connecting a chassis gateway and a power train gateway through a first Ethernet communication link, connecting the chassis gateway and a body gateway through a second Ethernet communication link, connecting the body gateway and a multimedia gateway through a third Ethernet communication link, connecting the multimedia gateway and the power train gateway through a fourth Ethernet communication link, connecting the chassis gateway and the multimedia gateway through a fifth Ethernet communication link, and connecting the power train gateway and the body gateway through a sixth Ethernet communication link; and maintaining a communication state by newly setting up another communication link communicable through Ethernet communication, if an error occurs in a corresponding communication link when two gateways among the chassis gateway, the power train gateway, the body gateway and the multimedia gateway communicate with each other through the Ethernet communication.

In an exemplary embodiment, the maintaining the communication state by newly setting up the communication link communicable through the Ethernet communication may include: transmitting, by a first gateway which is one selected from the chassis gateway, the power train gateway, the body gateway and the multimedia gateway, a proposal message signal to a second gateway in a communication link error state via third and fourth gateways communicable through the Ethernet communication; transmitting, by the second gateway in the communication link error state, an agreement message signal to the first gateway via the third and fourth gateways communicable through the Ethernet communication; and setting up a new communication link, when the first gateway receives the agreement message signal.

In another exemplary embodiment, the new communication link may be specified into several links according to short and long communication routes, and a priority order may be provided to the short communication route.

In still another exemplary embodiment, the priority order of the communication route may be periodically updated according to information on an available bandwidth, a delay and a link state.

In yet another exemplary embodiment, the communication route provided with the priority order may be used as routing table information in each gateway.

Other aspects and exemplary embodiments of the invention are discussed infra.

As described above, the prevent invention provides advantages as follows.

First, the domain gateways of the integrated control modules mounted in the vehicle are connected to each other through the Ethernet backbone network, so that each integrated control module can perform large-capacity and high-speed communication, based on the Ethernet communication.

Second, in a case where an error occurs in a communication line between the domain gateways, the fail-safe function of selecting an alternative communication line is provided quickly, thereby ensuring the reliability of the Ethernet backbone network.

Third, the large-capacity and high-speed communication having communication reliability is performed between the integrated control modules mounted in the vehicle, so that it is possible to use and apply advanced driver assistance systems (ADAS) using high-capacity image data and to easily extend services using an external high-speed infrastructure network (3G, LTE, WiFi, etc.).

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

A chassis integrated control system, a body control module (BCM), and integrated control modules such as a multimedia system integrated with an external interface function, a navigation function and the like are mounted in a vehicle. In particular, the chassis integrated control system integrally controls a suspension system, a steering system, a braking system and the like including a power train unit for controlling an engine, a transmission and the like. The BCM integrally controls various kinds of convenience devices including a vehicle speed sensitive wire, a power window and the like.

In the present invention, domain gateways of various kinds of integrated control modules mounted in a vehicle are connected through an Ethernet backbone network, so that the integrated control modules can perform large-capacity and high-speed communications, based on Ethernet communication.

Figure 2:
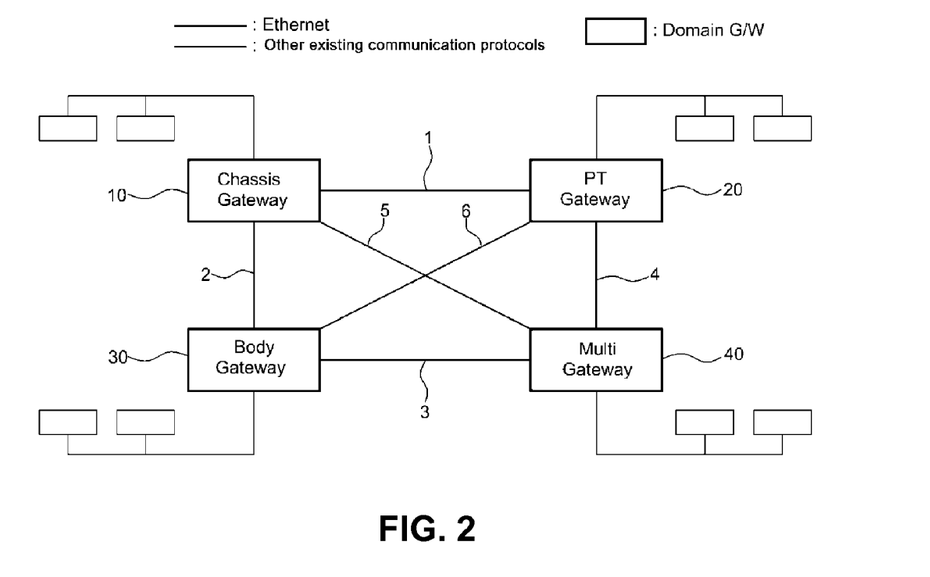
FIG. 2 is an exemplary view illustrating the Ethernet backbone network system for a vehicle according to the present invention.

As shown in FIG. 2, a chassis gateway 10 for communication of a chassis integrated control system, a power train (PT) gateway 20 for communication of a power train control unit, a body gateway 30 for communication of a body control module, and a multimedia gateway 40 for communication of a multimedia system are connected to each other through an Ethernet backbone network so as to perform large-capacity and high-speed communication, based on Ethernet communication.

In particular, the chassis gateway 10, the power train gateway 20, the body gateway 30 and the multimedia gateway 40 are connected in series to each other, based on the Ethernet communication, and simultaneously connected to cross each other, so that one gateway selected from the chassis gateway 10, the power train gateway 20, the body gateway 30 and the multimedia gateway 40 is connected to communicate with the other three gateways through the Ethernet communication.

To this end, the chassis gateway 10 and the power train gateway 20 are connected by a first Ethernet communication link 1 to communicate with each other through the Ethernet communication, and the chassis gateway 10 and the body gateway 30 are connected by a second Ethernet communication link 2 to communicate with each other through the Ethernet communication.

The body gateway 30 and the multimedia gateway 40 are connected by a third Ethernet communication link 3 to communicate with each other through the Ethernet communication, and the multimedia gateway 40 and the power train gateway 20 are connected by a fourth Ethernet communication link 4 to communicate with each other through the Ethernet communication.

The chassis gateway 10 and the multimedia gateway 40 are connected by a fifth Ethernet communication link 5 to communicate with each other through the Ethernet communication, and the power train gateway 20 and the body gateway 30 are connected by a sixth Ethernet communication link 6 to communicate with each other through the Ethernet communication.

Through the Ethernet backbone network configured as described above, one gateway selected from among the chassis gateway 10, the power train gateway 20, the body gateway 30 and the multimedia gateway 40 is connected to communicate with the other three gateways through the Ethernet communication, thereby perform high-speed and large-capacity data communication.

Meanwhile, components (e.g., an upper controller, a lower controller, etc.) of the chassis integrated control system, components of the power train control unit, components of the body control module or components of the multimedia system are connected to communicate with each other by one communication protocol selected from CAN, FlexRay and Most.

A method for controlling a fail safe of the Ethernet backbone network system for the vehicle will be described as follows.

Figure 1:
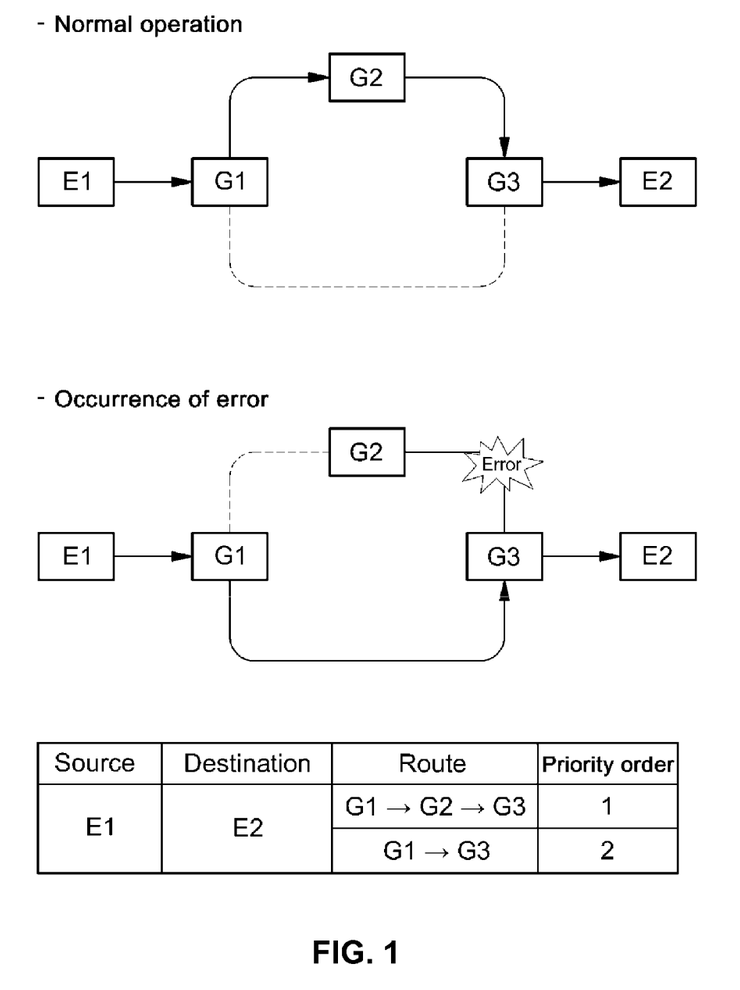
FIG. 1 is a conceptual view illustrating a method for controlling a fail safe of an Ethernet backbone network system according to the present invention.

FIG. 1 is a conceptual view illustrating a method for controlling a fail safe of the Ethernet backbone network system according to the present invention.

Referring to FIG. 1, gateways G1, G2 and G3 for the Ethernet communication between integrated control modules mounted in the vehicle have route information for each source/destination, and have priority order information on several route paths.

The priority order information may be determined by information on a state of the Ethernet communication link and an available bandwidth, etc.

As shown in FIG. 1, in a normal operation, the port of an Ethernet communication link connected from G1 to G2 is opened, and the port of a communication link connected from G1 to G3 is blocked, so that the route of the communication link becomes G1 G2 G3.

On the other hand, when an error occurs in a communication link with a high priority order, the source gateway G1 and the destination gateway G3 set a communication path of the next priority order to a new communication link by opening the port of the corresponding communication link.

Subsequently, G1 and G3 become in a communicable state through an alternative path corresponding to priority order 2, and accordingly, the route of the new communication link becomes G1→G3.

Thus, in FIG. 1, E1 and E2 corresponding to controllers may continuously perform communication in a state in which E1 and E2 do not recognize the occurrence of an error in the communication link through a series of processes described above.

A method for controlling fail safe of the Ethernet backbone network system according to an embodiment of the present invention will be described with reference to FIGS. 3A and 3B.

Although an error occurs in one of the first to sixth Ethernet communication links in a state in which the Ethernet backbone network is built up by connecting the chassis gateway 10 and the power train gateway 20 through the first Ethernet communication link 1, connecting the chassis gateway 10 and the body gateway 30 through the second Ethernet communication link 2, connecting the body gateway 30 and the multimedia gateway 40 through the third Ethernet communication link 3, connecting the multimedia gateway 40 and the power train gateway 20 through the fourth Ethernet communication link 4, connecting the chassis gateway 10 and the multimedia gateway 40 through the fifth Ethernet communication link 5, and connecting the power train gateway 20 and the body gateway 30 through the sixth Ethernet communication link 6, the fail safe may be made so that smooth Ethernet communication can be maintained.

In particular, in a case where an error occurs in a corresponding communication link when two gateways among the chassis gateway, the power train gateway, the body gateway and the multimedia gateway communicate with each other through the Ethernet communication, another communication link communicable through the Ethernet communication may be newly set up so that the communication state can be maintained.

Figure 3A:
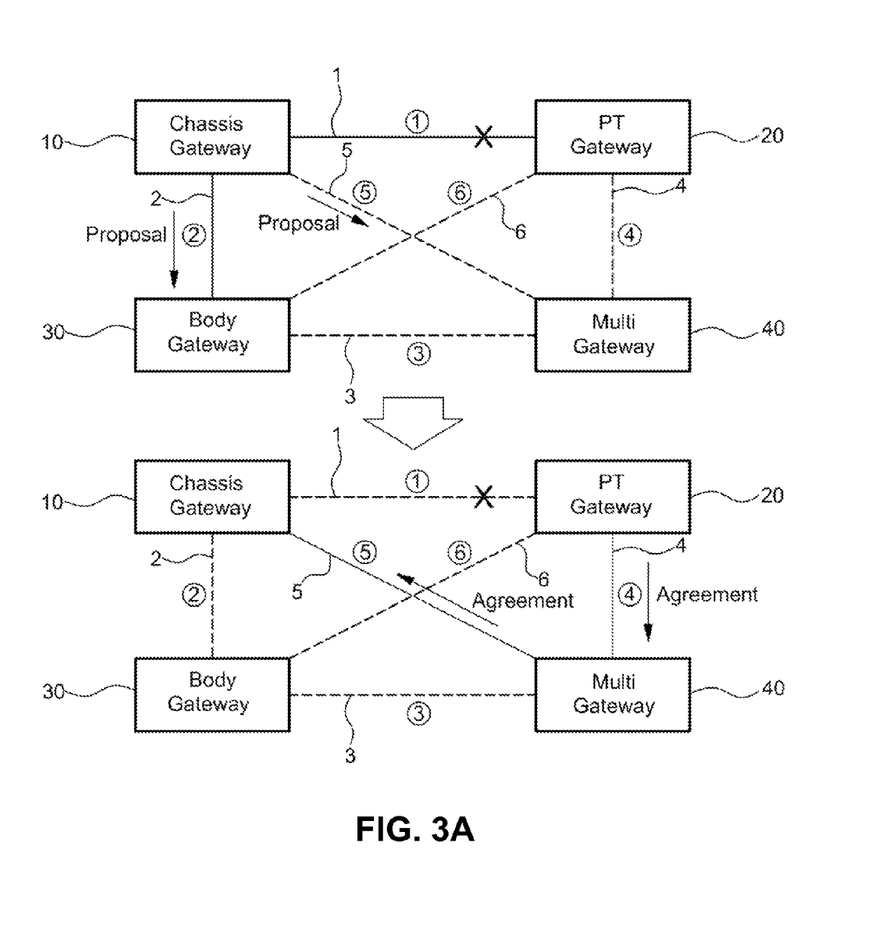
FIGS. 3A and 3B are exemplary views illustrating a method for controlling a fail safe of the Ethernet backbone network system according to an embodiment of the present invention.

As shown in FIG. 3A, if an error occurs in, for example, the first Ethernet communication link 1 through which the chassis gateway 10 and the power train gateway 20 are connected, the chassis gateway 10 transmits a proposal message for setting up a new communication link through all possible communication paths.

In particular, the chassis gateway 10 transmits the proposal message to the power train gateway 20 through the second Ethernet communication link 2 and the fifth Ethernet communication link 5.

In other words, the power train gateway 20 receives three paths ⑤→④, ②→⑥ and ②→③→④.

In this case, ⑤→④ is a path passing through the fifth Ethernet communication link 5, the multimedia gateway 40 and the fourth Ethernet communication link 4, and ②→⑥ is a path passing through the second Ethernet communication link 2, the body gateway 30 and the sixth Ethernet communication link 6. In addition, ②→③→④ is a path sequentially passing through the second Ethernet communication link 2, the body gateway 30, the multimedia gateway 40 and the fourth Ethernet communication link 4.

Next, the power train gateway 20 calculates an opportunity cost, and transmits an agreement message through the path ⑤→④ with the lowest opportunity cost.

In particular, the power train gateway 20 transmits the agreement message to the chassis gate 10 through the path ⑤→④ with the lowest opportunity cost.

Subsequently, the chassis gateway 10 receiving the agreement message certainly sets up, as a new communication link, the communication link ⑤→④ passing through the fifth Ethernet communication link 5, the multimedia gateway 40 and the fourth Ethernet communication link 4, and communicates with the power train gateway 20 through the new communication link.

As such, the new communication link is specified into several links according to short and long communication routes, and a fail-safe function of selecting an alternative communication line within a short time while assigning a priority order on the short communication route is performed, thereby ensuring the reliability of the Ethernet backbone network of the present invention.

Figure 3B:
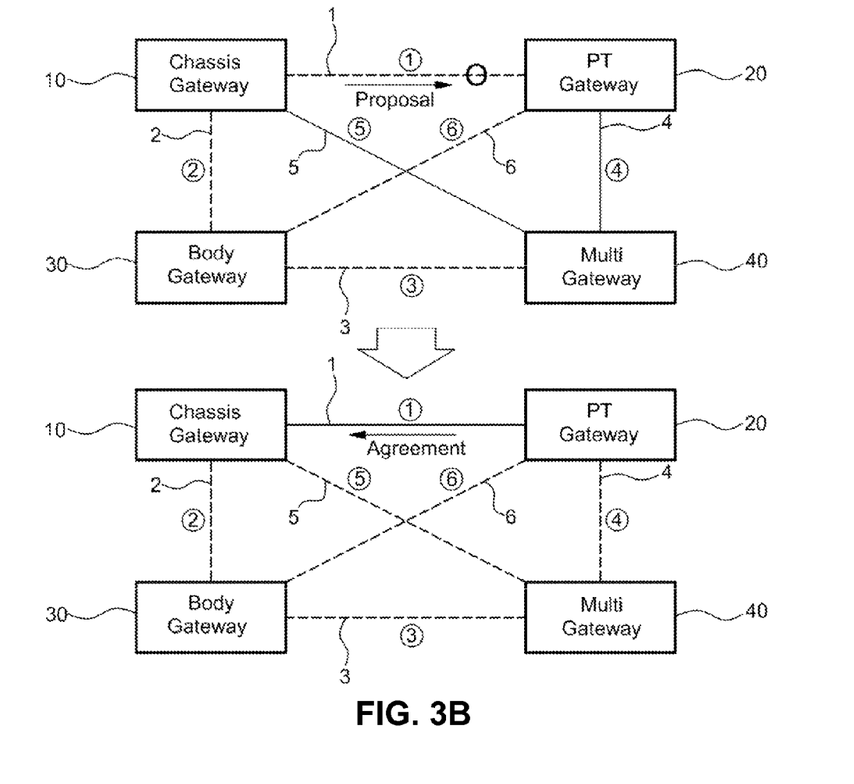

Meanwhile, as shown in FIG. 3B, if the error occurring in the first Ethernet communication link 1 through which the chassis gateway 10 and the power train gateway 20 are connected to each other is solved, the chassis gateway 10 directly transmits the proposal message for setting up a new communication link to the power train gateway 20 through the first Ethernet communication link 1, and the power train gateway 20 immediately responds to the agreement message, so that the chassis gateway 10 again sets up the first Ethernet communication link 1 as a new communication link.

Figure 4:
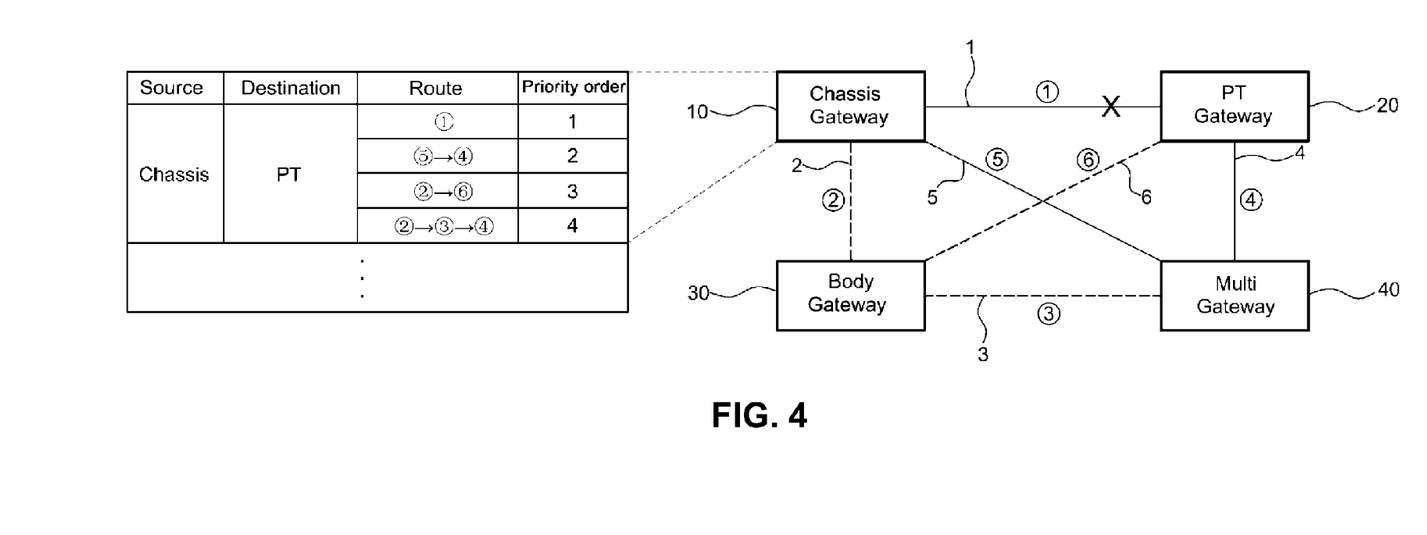
FIG. 4 is an exemplary view illustrating a method for controlling a fail safe of the Ethernet backbone network system according to another embodiment of the present invention.

As another embodiment of the present invention, each gateway may exclude a process of determining a path with the lowest opportunity cost by calculating the opportunity cost, and set up a new communication link by using a routing table including the priority order of communication links.

For example, in a case where the chassis gateway 10 and the power train gateway 20 communicate with each other through the Ethernet communication as shown in FIG. 4, a routing table is used. In the routing table, the first Ethernet communication link 1 is set up as a route with a first priority order, and ⑤→④ which is a path passing through the fifth Ethernet communication link 5, the multimedia gateway 40 and the fourth Ethernet communication link 4 is sets up as a route with a second priority order. In addition, ②→⑥ which is a path passing through the second Ethernet communication link 2, the body gateway 30 and the sixth Ethernet communication link 6 is set up as a route with a third priority order, and ②→③→④ which is a path sequentially passing through the second Ethernet communication link 2, the body gateway 30, the multimedia gateway 40 and the fourth Ethernet communication link 4 is set up as a route of a fourth priority order.

In a case where an error occurs in the first Ethernet communication link 1 for communication between the chassis gateway 10 and the power train gateway 20 as described above, the chassis gateway 10 performs Ethernet communication with the power train gateway 20 through ⑤→④ which is the route of the second priority order, using the routing table.

As such, in a case where an error occurs in a communication line between the domain gateways, the fail-safe function for selecting an alternative communication line can be performed quickly, using the routing table in which the priority order is provided to a short communication route in each gateway including several communication routes such as short and long communication routes, thereby ensuring the reliability of the Ethernet backbone network of the present invention.

Meanwhile, the priority order of the communication route for setting up the new communication link may be periodically updated according to information on an available bandwidth, a delay and a link state.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An Ethernet backbone network system, comprising:
   a chassis gateway for communication of a chassis integrated control system;
   a power train gateway for communication of a power train control unit;
   a body gateway for communication of a body control module;
   a multimedia gateway for communication for a multimedia system;
   a first Ethernet communication link for connecting the chassis gateway and the power train gateway to communicate with each other;
   a second Ethernet communication link for connecting the chassis gateway and the body gateway to communicate with each other;
   a third Ethernet communication link for connecting the body gateway and the multimedia gateway to communicate to each other;
   a fourth Ethernet communication link for connecting the multimedia gateway and the power train gateway to communicate with each other;
   a fifth Ethernet communication link for connecting the chassis gateway and the multimedia gateway to communicate with each other; and
   a sixth Ethernet communication link for connecting the power train gateway and the body gateway to communicate with each other,
   wherein, after an error occurs in a communication link among the first through sixth Ethernet communication links, a gateway among the chassis gateway, the power train gateway, the body gateway and the multimedia gateway transmits a proposal message for setting up a new communication link through all possible communication paths, and
   another gateway among the chassis gateway, the power train gateway, the body gateway and the multimedia gateway receives the proposal message, calculates an opportunity cost, and transmits an agreement message though a path with a lowest opportunity cost.

2. The Ethernet backbone network system of claim 1, wherein components of the chassis integrated control system, components of the power train control unit, components of the body control module or components of the multimedia system are connected to communicate with each other by a communication protocol selected from the group consisting of: controller area network (CAN), FlexRay and Media Oriented Systems Transport (MOST).

3. A method for controlling a fail safe of an Ethernet backbone network system for a vehicle, the method comprising the steps of:
   building up an Ethernet backbone network by connecting a chassis gateway and a power train gateway through a first Ethernet communication link, connecting the chassis gateway and a body gateway through a second Ethernet communication link, connecting the body gateway and a multimedia gateway through a third Ethernet communication link, connecting the multimedia gateway and the power train gateway through a fourth Ethernet communication link, connecting the chassis gateway and the multimedia gateway through a fifth Ethernet communication link, and connecting the power train gateway and the body gateway through a sixth Ethernet communication link; and maintaining a communication state by setting up a new communication link communicable through Ethernet communication, after an error occurs in a communication link among the first through sixth Ethernet communication links, wherein, in the step of maintaining the communication state, a gateway among the chassis gateway, the power train gateway, the body gateway and the multimedia gateway transmits a proposal message for setting up the new communication link through all possible communication paths, and another gateway among the chassis gateway, the power train gateway, the body gateway and the multimedia gateway receives the proposal message, calculates an opportunity cost, and transmits an agreement message though a path with a lowest opportunity cost.

4. The method of claim 3, wherein the step of maintaining the communication state by newly setting up the communication link communicable through the Ethernet communication further includes:

transmitting, by a first gateway which is one selected from the chassis gateway, the power train gateway, the body gateway and the multimedia gateway, the proposal message to a second gateway in a communication link error state via third and fourth gateways communicable through the Ethernet communication;

transmitting, by the second gateway in the communication link error state, the agreement message to the first gateway via the third and fourth gateways communicable through the Ethernet communication; and setting up the new communication link, when the first gateway receives the agreement message signal.

5. The method of claim 4, wherein the new communication link is specified into several links according to short and long communication routes, and a priority order is provided to the short or long communication route.

6. The method of claim 5, wherein the priority order of the short or long communication route is periodically updated according to information on an available bandwidth, a delay and a link state.

7. The method of claim 5, wherein the short or long communication route provided with the priority order is used as routing table information in each gateway.

* * * * *